Patented July 28, 1936

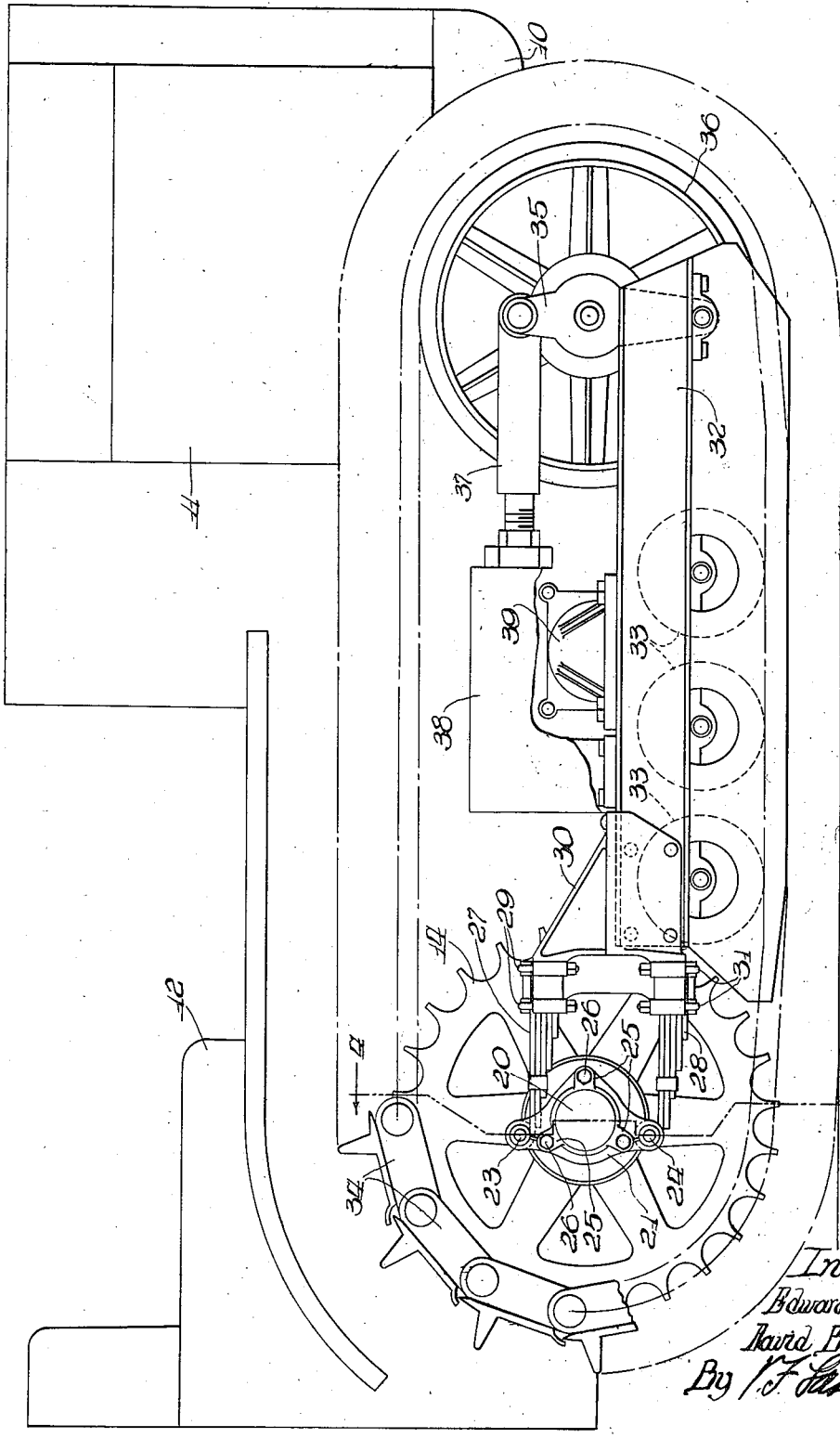

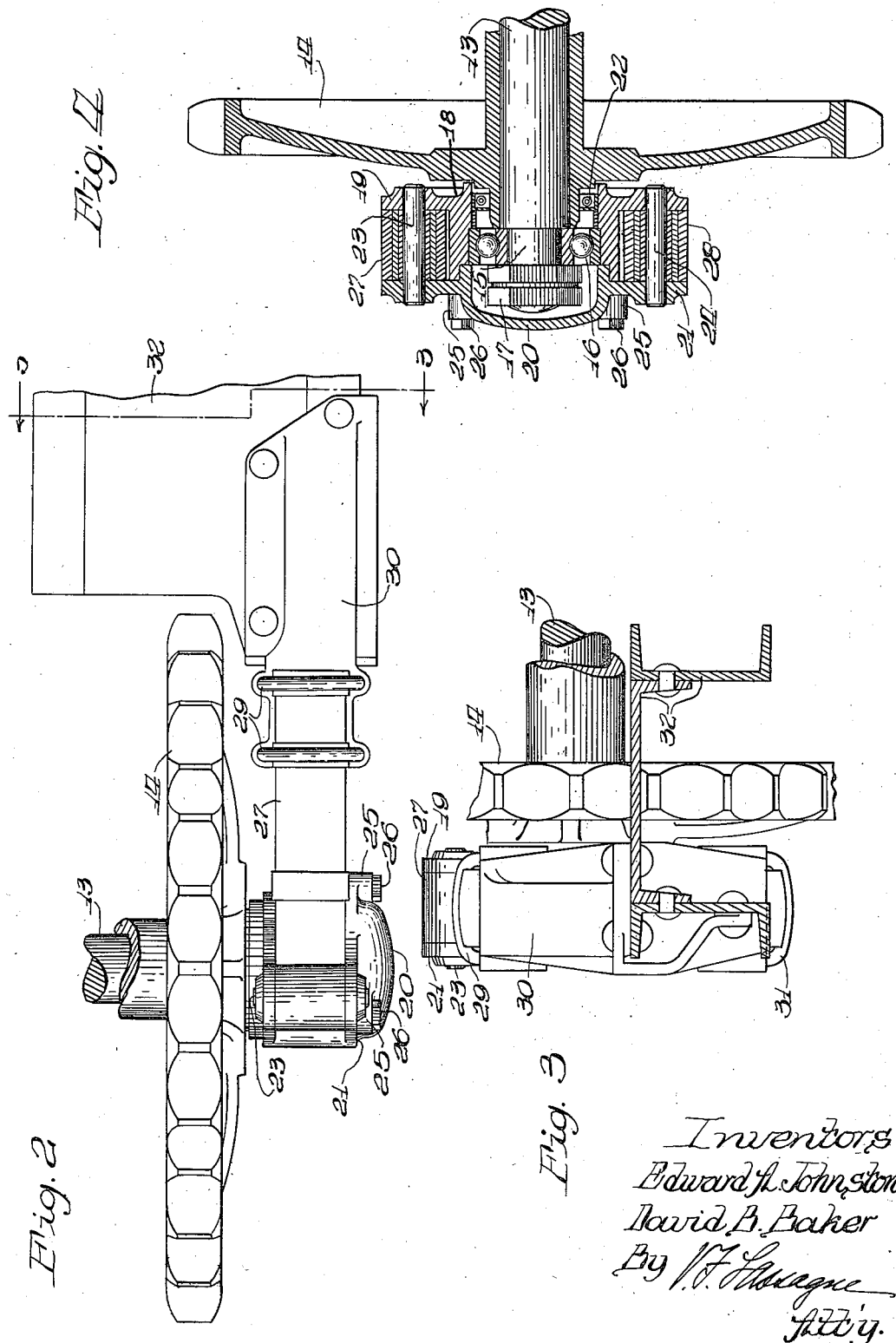

2,048,933

UNITED STATES PATENT OFFICE 2,048,933

TRACK TYPE TRACTOR

Edward A. Johnston, Chicago, and David B. Baker, Riverside, Ill., assignors to International Harvester Company, a corporation of New Jersey Application June 25, 1934, Serial No. 732,280

7 Claims. (Cl. 305—9)

The invention relates to track type tractors, and particularly to an improved means for mounting the body on the side truck mechanisms.

In tractors of this type, when both the dead load and driving torque forces are transmitted to the side trucks by the drive shafts carrying the track driving sprocket wheels, a serious problem is encountered in that considerable shock and jar is taken by certain bearings, causing them to wear quickly. Such jarring also makes for uncomfortable riding for the operator. It is desirable, therefore, to cushion the connection of the side trucks at their rear ends to overcome such objections.

Accordingly, the main object of the invention is to provide an improved form of cushion means for pivotally connecting the rear ends of the side trucks to the tractor body.

Another object is to provide such a connection which will improve the riding qualities of the tractor.

Still another object is to provide a cushioned load support connection between the body and side trucks to cushion the dead load as well as the driving torque transmitted therethrough.

Other objects will become apparent as the disclosure is more fully made.

Briefly, such objects are achieved in a track-type tractor having a body carrying at its rear end a transverse power driven shaft, or a pair of such shafts in alignment, with each having an outwardly projecting end carrying a driving sprocket wheel to drive the usual endless track belt. Outwardly of these sprocket wheels the shaft ends carry a bearing about which is turnable a capped sleeve having upper and lower bosses to carry upper and lower, short transverse shackle pins, to which are connected, respectively, a pair of superimposed, spaced, longitudinally forwardly extending leaf springs having their forward ends clamped to the rear end of a bracket in turn having its forward end securely bolted to the rear ends of the two respective rigid side, or roller truck frames. These side frames carry track rollers and are disposed in the usual manner within the endless belts. So much will suffice for the present in imparting a general idea of the improved structure of this invention, a practicable form of which is illustrated in the accompanying sheets of drawings, wherein:

Figure 1 is a general side elevational view of a track tractor incorporating the suspension structure of this invention;

Figure 2 is a fragmentary plan view of one side only of the tractor body spring suspension means;

Figure 3 is a transverse cross sectional view through a roller truck frame, as taken along the line 3—3 of Figure 2, looking in the direction of the arrows; and, Figure 4 is a detail transverse cross sectional view through the suspension, at one side, as seen along the line 4—4 of Figure 1, looking toward the rear, as indicated by the arrows.

The body of the tractor is generally shown at 10, it carrying the usual hooded motor 11 at its front end and the driver's seat 12 at its rear end. At the rear end, the body carries the usual two aligned, transverse steering control and stub drive shafts, only one of which is shown at 13. On the outwardly projected ends of these shafts are secured the rotatable driving sprocket wheels 14. As both sides of the tractor are identically the same in construction, only one side has been shown and will be described.

As shown in Figure 4, the end of the shaft 13 is projected a short distance laterally of the sprocket wheel 14, where it is reduced, as at 15, to carry an antifriction bearing 16 held in place by the nuts 17. Mounted for rocking pivotal motion on this bearing 16 is a sleeve or collar 18 having upwardly and downwardly extending ears 19. The outer end of this collar 18 is recessed to receive a dust proof, oil retaining cap 20 having upwardly and downwardly extending ears 21, corresponding with the ears 19 already described. A dirt proof and oil retaining seal 22 is located between the bearing 16 and sprocket wheel 14, as shown.

The upper pair of ears 19, 21 carry a transverse shackle pin 23 and the lower ears 19, 21 similarly carry a similar transverse shackle pin 24. The cap 20 is provided with apertured bosses 25, that receive stud bolts 26 to secure the cap 20 to the collar 18. The cap 20 thus is turnable with the collar 18, as will later appear.

Connected to the upper shackle pin 23 is a forwardly extending, flat, laminated spring 27. A similar spring 28 is connected to the pin 24. The springs 27, 28 are thus spaced apart in parallelism above and below the pivot collar 18. The forward end of the upper spring 27 is secured by U-bolts 29 to the rear upper end of a stout bracket 30, while the forward end of the lower spring 28 is connected by the U-bolts 31 to the lower rear end of the same bracket 30.

The front end of this bracket 30 is appropriately shaped snugly to fit over the top and outer side of the rear end of the usual roller truck frame 32, which extends longitudinally forwardly of the bracket 30 at the side of the tractor. The bracket 30, as shown, is securely bolted to the truck frame 32. This frame 32 carries the usual track or truck rollers 33 riding in the usual way on the ground stretch of an endless track shoe belt 34 to carry the weight of the tractor. The forward end of the frame 32 carries an upstanding pivoted arm 35 on which is journaled the usual front idler guide wheel 36, around which the chain or belt 34 is trained. The idler 36 and its mount 35 are backed by the usual take-up yoke 37 covered by a shield 38 and carried in the usual way on top of the frame 32.

As is well understood in the art, there are two of such track units, as just described, one on each side of the tractor. Behind a cap 39 on each frame 32 is a transverse equalizer bar, not shown, the ends of which rest on the two truck frames 32. This bar, as is usual in the art, extends under the body and supports the weight of the forward portion thereof and transmits it to the side trucks.

By means of this construction, the track frames 32 may rise and fall vertically about the collar pivot 18 independently of each other, to conform to ground contour, and through the equalizer bar in the conventional manner prevent racking and twisting strains from being communicated to the body.

The flexible spring connection 27, 28 between the power and load distributing shaft 13 and the side truck 32 is such that these forces are cushioned. Obviously, the riding qualities of the tractor are thus materially improved. Further, this spring connection permits of both pivotal movement of the side trucks 32 about the pivotal collar 18, as well as some bodily translational vertical movement. Such movements permit unusual flexibility for the tracks in accommodating their travel to ground irregularities. Further, assembly and disassembly of the truck frames 32 from the shaft 13 is made easy because the spring load transmitting supports 27, 28 are on the outer side of the sprocket wheel 14, where they are readily accessible.

From this disclosure it can be seen that an improved form of tractor suspension has been provided, which achieves the desirable objects heretofore recited.

It is the intention to cover herein all changes and modifications not departing from the scope of the invention as hereinafter defined.

What is claimed is:

1. In a track tractor, a body, a transverse shaft carried thereby, a driving sprocket wheel on the shaft, an endless track driven by said wheel, a collar turnably mounted on the shaft, an ear extending from the collar, a cap closing the end of the collar and secured thereto to turn therewith, an ear extenting from the cap, a transverse shackle pin carried by said two ears, a longitudinal forwardly extending laminated leaf spring connected to said pin, a longitudinally disposed roller truck frame within the track, and means connecting said spring at its forward end to the rear end of the truck frame.

2. In a track tractor, a body, a transverse shaft carried thereby, a driving sprocket wheel on the shaft, an endless track driven by said wheel, a collar turnably mounted on the shaft, a cap closing the collar and secured thereto to turn therewith, upwardly extending ears arranged in transverse spaced relation from the cap and collar, a transverse pin carried by the said ears, downwardly extending ears arranged in transverse spaced relation from the cap and collar, a transverse pin carried by said latter pair of ears, a pair of forwardly extending laminated leaf springs respectively connected to the upper and lower pins, a roller truck within the track, and means connecting the forward ends of the springs to said truck.

3. In a track tractor, a body, a transverse shaft carried thereby, a driving sprocket wheel on the shaft, an endless track driven by said wheel, a collar turnably mounted on the shaft, a pair of longitudinally forwardly extending laminated springs connected to said collar, said springs being spaced vertically and in parallel relation with one above the collar and the other there below, said springs further being of short length and terminating at points adjacent the front edge of the sprocket wheel, a longitudinally disposed inflexible roller truck frame within the track, a rigid bracket secured to the rear end of the truck, and clamp means on the bracket for securing the forward ends of the springs to the rear end of said bracket.

4. A track tractor having a body carrying a transverse shaft, a driving sprocket wheel on the shaft, an endless track driven by said wheel, a bearing on the outer end of the shaft, a collar turnably mounted on said bearing, a cap closing the collar and secured thereto, a roller truck frame within the track, said collar and cap having upward extensions and downward extensions, the upward extensions being cross connected by a shackle pin and the downward extensions being similarly cross connected by another shackle pin whereby the collar and cap are turnable as a unit on the bearing, a bracket mounted on the roller truck frame, said bracket extending vertically a distance equal to the spacing of the upward and downward extensions, an upper horizontal leaf spring having one end shackled to the upper pin and its other end clamped to the upper portion of said bracket, and a lower horizontal leaf spring having one end shackled to the lower pin and its other end clamped to the lower portion of said bracket, said springs serving as weight transmitting connections between the body and roller truck.

5. A track tractor having a body carrying a transverse shaft, a driving sprocket wheel on the shaft, an endless track driven by said wheel, a bearing on the outer end of the shaft, a collar turnably mounted on said bearing, a cap closing the collar and secured thereto, said cap and collar having vertically disposed extensions cross connected by a shackle pin to cause the collar and cap to be turnable as a unit on said bearing, a roller truck frame, a bracket on the frame, and a horizontal leaf spring having one end shackled to said pin and its other end clamped to said bracket, said spring constituting a flexible weight transmitting connection between the body and roller truck.

6. In a track tractor, a longitudinal body, a transverse shaft carried thereby at the rear end of the body, a driving sprocket wheel carried on the shaft at one side of the body, an endless track disposed longitudinally at the side of the body and driven by said wheel, a collar turnably mounted on an outer end of the shaft, a pair of longitudinally forwardly extended laminated springs connected to said collar, said springs being spaced vertically and in parallel relation throughout their length with one above the collar and the other therebelow, said springs being of short length and terminating at their front ends adjacent the forward edge of the sprocket wheel, a longitudinally disposed inflexible roller truck frame within the track, and means securing the forward ends of said springs in their proper spaced parallel relation to the rear end of said roller truck frame, said means comprising a rigid bracket mounted on the rear end of the roller truck frame and including clamps for clamping the forward ends of the springs.

7. A track tractor having a longitudinal body carrying at its rear end a transverse shaft, one end of which carries a driving sprocket wheel for an endless track longitudinally disposed at the side of the body, an inflexible roller truck frame arranged longitudinally within the track and carrying a rigid upright bracket at its rear end adjacent the front edge of the sprocket wheel, a clamp at the upper end of the bracket and a clamp at the lower end of the bracket, a bearing on the shaft adjacent the sprocket wheel, a collar turnably mounted on said bearing, said collar at its upper end carrying a shackle pin in substantial horizontal alinement with the upper clamp on the bracket, said collar at its lower end carrying a shackle pin in substantial horizontal alinement with the lower clamp on the bracket, a horizontal leaf spring extending between and connected to the upper shackle pin and upper clamp, and a parallel leaf spring extending between and connected to the lower shackle pin and lower clamp, whereby the inflexible truck frame may yield vertically and pivot about the axis of the shaft.

EDWARD A. JOHNSTON.
DAVID B. BAKER.